(12) United States Patent
Iriarte Jimenez et al.

(10) Patent No.: US 9,956,926 B2
(45) Date of Patent: May 1, 2018

(54) MAGNET FASTENER ASSEMBLY

(71) Applicant: FORD GLOBAL TECHNOLOGIES, LLC, Dearborn, MI (US)

(72) Inventors: Juan Carlos Iriarte Jimenez, Mexico City (MX); Luis Miguel Lopez Gonzalez, Mexico City (MX); Gabriel Ortiz Vega, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 14/602,814

(22) Filed: Jan. 22, 2015

(65) Prior Publication Data
US 2016/0214547 A1 Jul. 28, 2016

(51) Int. Cl.
*B60R 13/02* (2006.01)
*F16B 11/00* (2006.01)
*F16B 1/00* (2006.01)
*F16B 5/06* (2006.01)
*F16B 19/02* (2006.01)

(52) U.S. Cl.
CPC ...... *B60R 13/0206* (2013.01); *B60R 13/0218* (2013.01); *F16B 5/065* (2013.01); *F16B 11/006* (2013.01); *B60R 2013/0293* (2013.01); *F16B 19/02* (2013.01); *F16B 2001/0035* (2013.01)

(58) Field of Classification Search
CPC ............ B60R 13/0206; B60R 13/0218; B60R 2013/0293; F16B 11/006; F16B 1/00; F16B 5/065; F16B 19/02; F16B 2001/0035

USPC .......................................................... 24/303
See application file for complete search history.

(56) References Cited

U.S. PATENT DOCUMENTS

| 5,280,991 | A | 1/1994 | Weiland | |
|---|---|---|---|---|
| 6,857,809 | B2 | 2/2005 | Granata | |
| 7,306,190 | B2 | 12/2007 | Tisol, Jr. | |
| 7,435,031 | B2 * | 10/2008 | Granata | B60R 13/0206 403/329 |
| 8,287,034 | B2 | 10/2012 | Smith et al. | |
| 8,615,852 | B2 * | 12/2013 | Smith | B60R 13/0206 24/114.2 |
| 2006/0127172 | A1 * | 6/2006 | Tisol, Jr. | B60R 13/0206 403/410 |
| 2010/0289288 | A1 * | 11/2010 | Smith | B60R 13/0206 296/35.1 |
| 2011/0140474 | A1 * | 6/2011 | Smith | B60R 13/0206 296/35.1 |
| 2013/0305497 | A1 * | 11/2013 | Coman | B62D 27/06 24/303 |
| 2014/0001321 | A1 | 1/2014 | Huelke et al. | |
| 2015/0283957 | A1 * | 10/2015 | Dickinson | F16B 5/123 24/303 |
| 2016/0040693 | A1 * | 2/2016 | Popovski | B60R 13/02 24/303 |
| 2016/0059796 | A1 * | 3/2016 | Linson | B60R 13/0212 24/289 |

(Continued)

*Primary Examiner* — Robert Sandy
*Assistant Examiner* — Louis A Mercado
(74) *Attorney, Agent, or Firm* — Vichit Chea; King & Schickli, PLLC

(57) ABSTRACT

A magnet fastener assembly includes a carrier having a body including a magnet seat with a conical bottom wall and an outer rim wall. A magnet cup is received within the rim wall overlying the conical bottom wall. Further a magnet is held in the magnet cup.

13 Claims, 3 Drawing Sheets

(56) References Cited

U.S. PATENT DOCUMENTS

2016/0068117 A1\* 3/2016 Huelke ................... H01F 7/02
 24/303

\* cited by examiner

MAGNET FASTENER ASSEMBLY

TECHNICAL FIELD

This document relates generally to the fastener field and, more particularly, to a magnet fastener assembly including a magnet seat with a conical bottom wall and an outer rim wall.

BACKGROUND

Magnet fasteners or clips are well known in the art and are often utilized to fasten body panels and automobile interior trim piece panels, such as a headliner, to the body or chassis of a vehicle. Such fasteners must allow for articulation in order to accommodate manufacturing tolerances and/or irregular body contours so as to provide proper fastening.

This document relates to a new and improved magnet fastener assembly that incorporates a carrier having a body including a magnet seat with a conical bottom wall and an outer rim wall.

SUMMARY

In accordance with the purposes and benefits described herein, a magnet fastener assembly is provided. That magnet fastener assembly comprises a carrier having a body including a magnet seat with a conical bottom wall and an outer rim wall. A magnet cup is received within the rim wall overlying the conical bottom wall. In addition the magnet fastener assembly includes a magnet held in the magnet cup.

In one possible embodiment, the assembly further includes a magnet fastener projecting from the conical bottom wall within the outer rim wall of the magnet seat. The magnet cup and the magnet both include central openings. The magnet fastener extends through these two central openings to secure the magnet cup and the magnet to the carrier on the magnet seat overlying the conical bottom wall.

In one possible embodiment, the magnet fastener assembly further includes a damping material between the magnet cup and the conical bottom wall of the magnet seat. In one possible embodiment, the conical bottom wall has a tilt angle of between about 3° and 7°. In another possible embodiment the conical bottom wall has a tilt angle of about 5°.

In another possible embodiment of the magnet fastener assembly, a plurality of glue holes are provided in the carrier body. At least one of those plurality of glue holes includes a conically/shaped sidewall. In one possible embodiment, the body includes a first face and a second face. The magnet seat is provided on the first face. Further, the conically shaped sidewall has a first end at the first face and a second end at the second face. The first end has a diameter $D_1$ and the second end has a diameter $D_2$ where $D_1 > D_2$. Thus, the wider end of the conically shape sidewall is oriented toward the first face and the magnet seat.

In one possible embodiment, the conically shaped sidewall extends an angle of about 45° with respect to the first face.

In one possible embodiment, the magnet fastener assembly further includes a locator pin. The magnet seat and the locator pin are both provided on the first face of the body. In one possible embodiment, the magnet cup of the magnet fastener assembly is made from a ferromagnetic material to enhance the magnetic attractive force of the magnet held in the cup. Further, in one possible embodiment the entire carrier, including the magnet seat and the locator pin, has a unitary molded construction.

In accordance with an additional aspect, a carrier is provided for holding a magnet fastener subassembly where that subassembly includes a magnet cup and a magnet. The carrier comprises a body including a magnet seat with a conical bottom wall and an outer rim wall.

In accordance with one possible embodiment, the carrier further includes a magnet fastener projecting from the conical bottom wall within the outer rim wall. In another possible embodiment, the carrier includes a plurality of glue holes in the body. In yet another possible embodiment, the body of the carrier has a first face and a second face. The magnet seat is provided on the first face. Further at least one of the pluralities of conical glue holes has a conically shaped sidewall having a wide end at the first face.

In the following description, there are shown and described several preferred embodiments of the magnet fastener. As it should be realized, the magnet fastener is capable of other, different embodiments and its several details are capable of modification in various, obvious aspects all without departing from the magnet fastener as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the magnet fastener assembly as well as the carrier of that assembly and together with the description serve to explain certain principles thereof. In the drawing figures.

Reference will now be made in detail to the present preferred embodiments of the magnet fastener assembly and carrier, examples of which are illustrated in the accompanying drawing figures.

DETAILED DESCRIPTION

Figure 1:
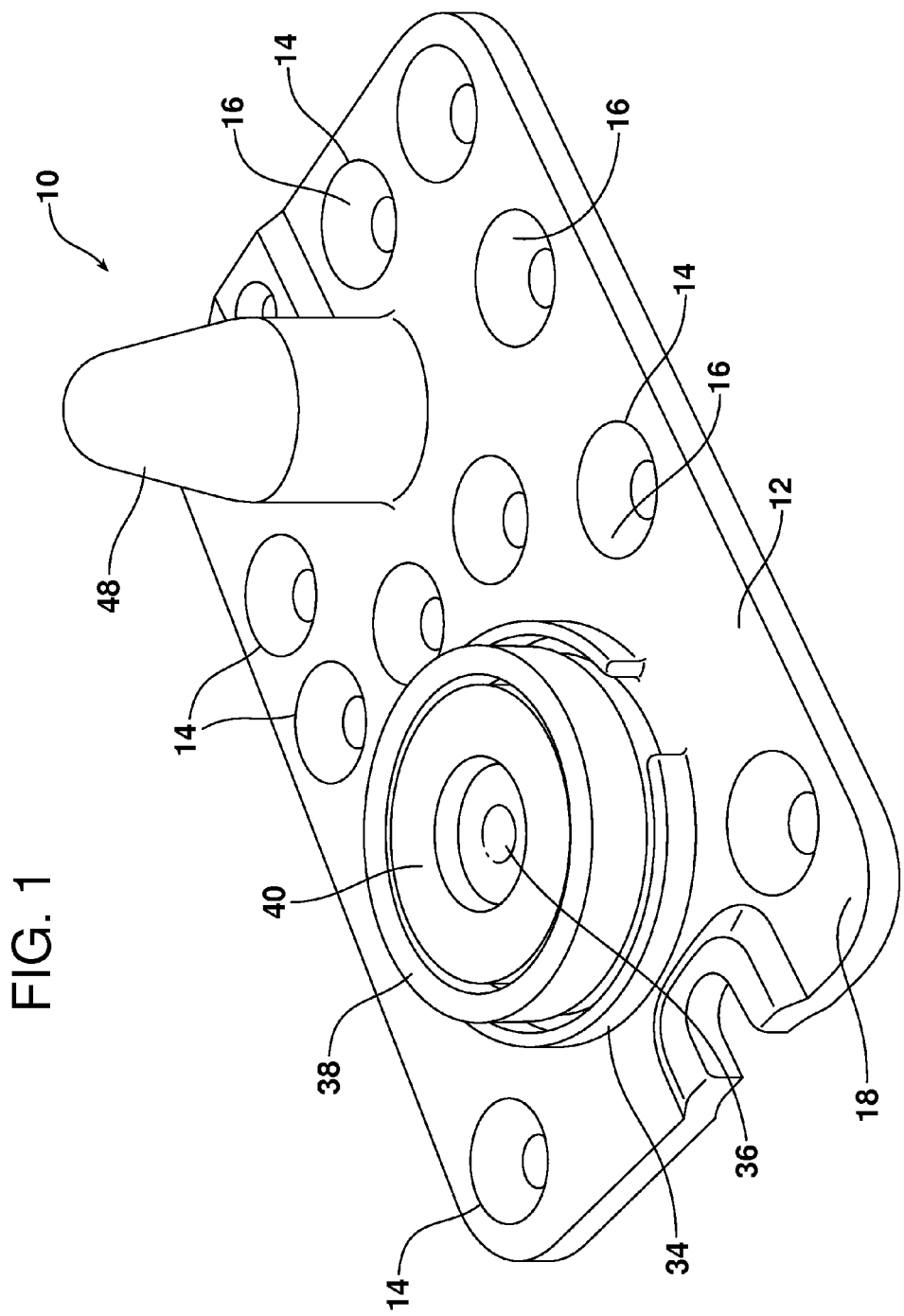
FIG. 1 is a perspective view of the magnet fastener assembly including the carrier, the magnet cup and the magnet held in the magnet cup.
Figure 3:
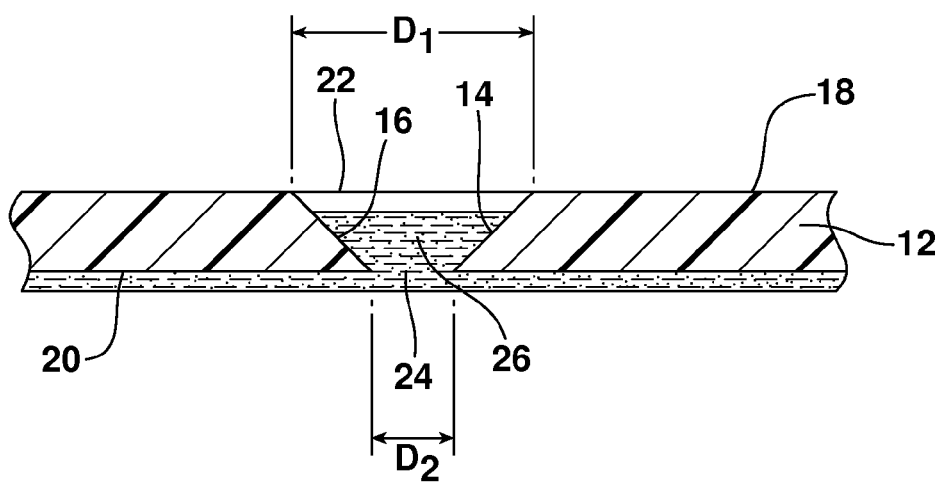
FIG. 3 is a detailed view illustrating how the adhesive permeates one of the glue holes along the conically shaped sidewall to better connect the carrier to the headliner.

Reference is now made to FIG. 1 illustrating the magnet fastener assembly 10. That assembly 10 includes a carrier having a substantially planar, low-profile body 12 including a plurality of glue holes 14. In the illustrated embodiment, each glue hole 14 includes a conically shaped sidewall 16. As best illustrated in FIG. 3, the body 12 includes a first face 18 and a second face 20. The glue hole 14 includes a first end 22 having a first diameter $D_1$ and a second end 24 having a second diameter $D_2$ where $D_1 > D_2$. The first end 22 is provided at first face 18 while the second end 24 is provided at the second face 20. Thus, it should be appreciated that the conically shaped sidewall 60 has the wide end oriented toward the first face 18.

In the illustrated embodiment, the conically shaped sidewall 16 is oriented at an angle of 45° with respect to the first face 18 and second face 20. When the carrier body 12 is secured to the headliner H with adhesive, it should be appreciated that the adhesive fills the glue hole 14. When the adhesive cures, the adhesive forms an conically shaped protrusion 26 that will not pull through the second, smaller end 24 of the glue hole 14 thereby enhancing the strength of the connection provided by the adhesive between the carrier body 12 and the headliner H.

Figure 2:
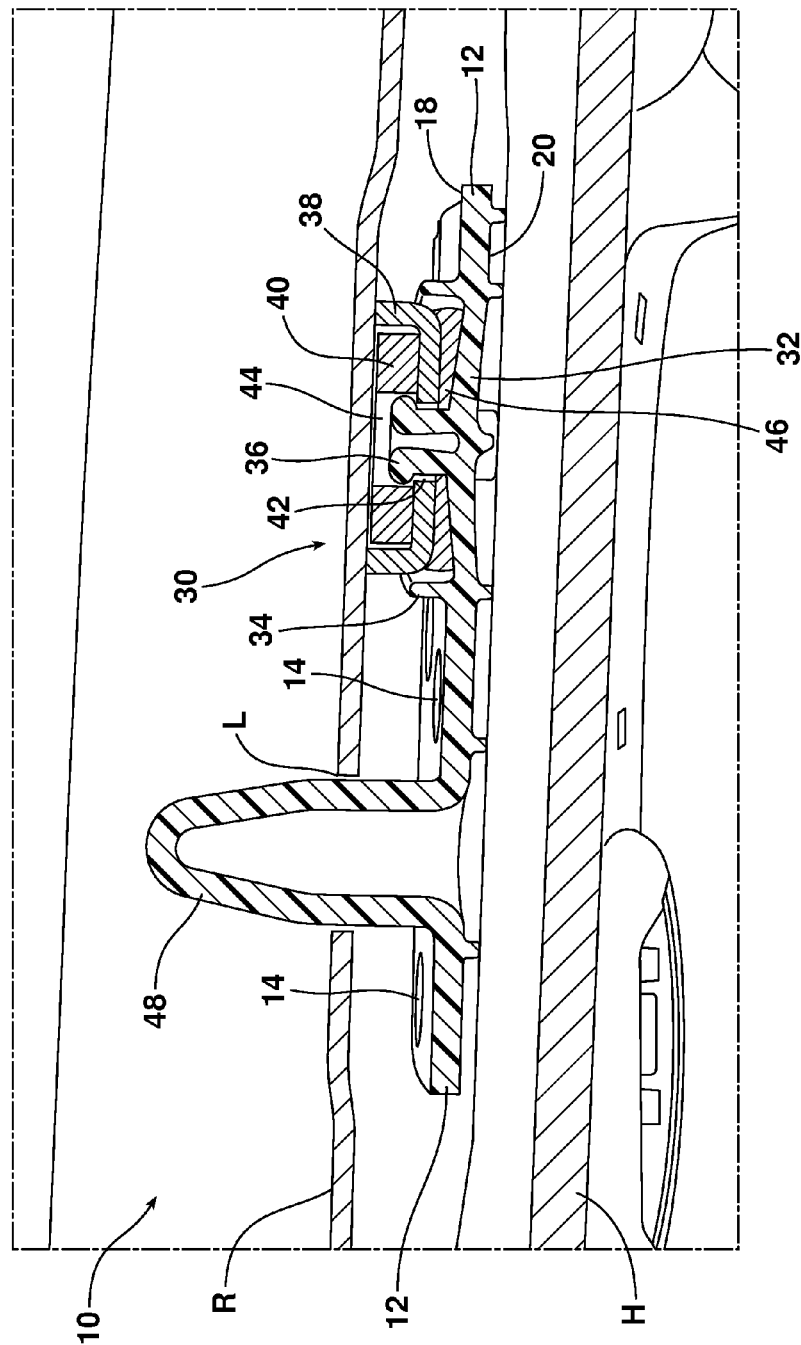
FIG. 2 is a cross-sectional view of the magnet fastener assembly illustrating how the magnet fastener assembly is utilized to secure a headliner to the metal roof infrastructure of a motor vehicle.

As further illustrated in FIGS. 1 and 2, the carrier body also includes a magnet seat 30 on the first face 18 of the body 12. The magnet seat 30 includes a conical bottom wall 32 and an outer rim wall 34. In the illustrated embodiment the outer rim wall 34 forms a continuous circle. A magnet fastener 36 projects from the conical bottom wall 32 at the center of the magnet seat 30 within the concentric outer rim wall 34. A magnet cup 38 is received within the rim wall 34 overlying the conical bottom wall 32. The magnet 40 is held in the magnet cup.

It should be appreciated both the magnet cup 38 and the magnet 40 include central openings 42, 44. When properly seated on the magnet seat 30, the magnet 40 is held in the magnet cup 38 and both the magnet and magnet cup are held on the magnet seat 30 by the fastener which extends through the central openings 42, 44 in the magnet cup and magnet respectively. As should be appreciated, the magnet cup 38 and magnet 40 may be permanently secured in the magnet seat 30 by the fastener 36 through heat staking or other means.

As should be appreciated, the conical bottom wall 32 of the magnet seat 30 has a high point at the concentric center of the rim wall 34 and a tilt angle of between 3° and 7°. In one particularly useful embodiment the tilt angle is about 5°. The magnet cup 38 is captured on the fastener 36 but remains free to tilt the full 360° around the fastener along the conical bottom wall with the only limit to movement being the tilt angle of that wall. This allows the magnet cup 38 and the magnet 40 held therein to tilt so as to provide a substantially flush engagement against a substrate such as a metal roof infrastructure and thereby better accommodate manufacturing tolerances and/or irregular body contours so as to provide proper fastening.

In the illustrated embodiment, a damping material 46 is provided in the magnet seat 30 within the rim wall 34 between the magnet cup 38 and the conical bottom wall 32. This damping material 46 is particularly adapted to allow relative articulating movement of the magnet cup 38 on the conical bottom wall 32 while at the same time damping vibration and thereby limiting ticking and rattling of the cup 38 relative to the carrier body 12. That damping material 46 may be a damping foam, such as vinyl nitrile.

As further illustrated in FIGS. 1 and 2, the carrier may also include a locator pin 48. The locator pin 48 is provided on the first face 18 of the carrier body 12 adjacent the magnet seat 30. The function of a locator pin 48 will be discussed below.

In one possible embodiment of the magnet fastener assembly 10, the carrier including the entire carrier body 12, the magnet seat 30 and the locator pin 48 are made from a unitary molded construction, using a plastic such as polypropylene, polycarbonate, acrylonitrile butadiene styrene (ABS) or an ABS copolymer. This significantly reduces construction costs. In one possible embodiment, the magnet cup 38 is made from a ferromagnetic material. Such a ferromagnetic material tends to enhance the magnetic field strength of the magnet 40 thereby increasing the magnetic attraction between the magnet fastener assembly 10 and the ferromagnetic infrastructure of the motor vehicle to which the magnet fastener assembly 10 is to be attached.

Reference is now made to FIG. 2 illustrating how the magnet fastener assembly 10 is utilized to secure a headliner H to a metal roof infrastructure R of a motor vehicle. First an adhesive (not shown) is applied at the appropriate position of the headliner H and/or the second face 20 of the carrier body 12. Next, the magnet fastener assembly 10 is secured at the desired position to the B-surface of the headliner H and the adhesive is allowed to cure. Next, the headliner H is secured to the roof infrastructure R of the motor vehicle by means off the magnet 40 of the magnet fastener assembly 10. The locator pin 48 is inserted in a locator aperture in the roof infrastructure R to insure proper positioning. The tilting magnet feature allows for the best possible connection while the damping material 46 virtually eliminates any ticking or rattling.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A magnet fastener assembly, comprising:
   a carrier having a locator pin and a body including a magnet seat with a conical bottom wall and an outer rim wall;
   a magnet cup received within said rim wall overlying said conical bottom wall;
   a magnet held in said magnet cup;
   a magnet fastener projecting from said conical bottom wall within said outer rim wall; and
   a damping material between said magnet cup and said conical bottom wall.

2. The assembly of claim 1, wherein said magnet cup and said magnet both include central openings and said magnet fastener extends through said central openings to secure said magnet cup and said magnet to said carrier overlying said conical bottom wall.

3. The assembly of claim 1, wherein said conical bottom wall has a tilt angle of between 3 degrees and 7 degrees.

4. The assembly of claim 1, wherein said conical bottom wall has a tilt angle of about 5 degrees.

5. The assembly of claim 1, wherein said damping material is selected from a group of materials consisting of a damping foam.

6. The assembly of claim 1, further including a plurality of glue holes in said body.

7. The assembly of claim 6, wherein at least one of said plurality of glue holes includes a conically-shape sidewall.

8. The assembly of claim 7, wherein said body includes a first face and a second face and said magnet seat is provided on said first face.

9. The assembly of claim 8, wherein said conically-shape sidewall has a first end at said first face and a second end at said second face wherein said first end has a diameter $D_1$ and said second end has a diameter $D_2$ where $D_1 > D_2$.

10. The assembly of claim 9, wherein said conically-shape sidewall extends at an angle of about 45° with respect to said first face.

11. The assembly of claim 1, wherein said magnet seat and said locator pin are both provided on a first face of said body.

12. The assembly of claim 11, wherein said carrier including said magnet seat and said locator pin has a unitary molded construction.

13. The assembly of claim 11, wherein said magnet cup is made from a ferromagnetic material.

\* \* \* \* \*